US011283386B2

(12) United States Patent
Kashihara et al.

(10) Patent No.: US 11,283,386 B2
(45) Date of Patent: Mar. 22, 2022

(54) POWER CONVERSION DEVICE

(71) Applicant: SANDEN HOLDINGS CORPORATION, Isesaki (JP)

(72) Inventors: Tatsuki Kashihara, Isesaki (JP); Takahiro Saigusa, Isesaki (JP)

(73) Assignee: SANDEN HOLDINGS CORPORATION, Isesaki (JP)

( * ) Notice: Subject to any disclaimer, the term of this patent is extended or adjusted under 35 U.S.C. 154(b) by 80 days.

(21) Appl. No.: 16/769,996

(22) PCT Filed: Nov. 15, 2018

(86) PCT No.: PCT/JP2018/042247
§ 371 (c)(1),
(2) Date: Jun. 4, 2020

(87) PCT Pub. No.: WO2019/123911
PCT Pub. Date: Jun. 27, 2019

(65) Prior Publication Data
US 2020/0389118 A1 Dec. 10, 2020

(30) Foreign Application Priority Data
Dec. 22, 2017 (JP) .............................. JP2017-246450

(51) Int. Cl.
H02P 27/08 (2006.01)
H02M 7/5387 (2007.01)
(Continued)

(52) U.S. Cl.
CPC ............ *H02P 27/08* (2013.01); *B60H 1/3222* (2013.01); *H02M 7/53873* (2013.01); *H02P 29/68* (2016.02)

(58) Field of Classification Search
CPC ... B60H 1/3222; H02P 29/68; H02M 7/53871
See application file for complete search history.

(56) References Cited

U.S. PATENT DOCUMENTS 7,688,018 B2 * 3/2010 Goto ...................... H02P 27/08
318/599
8,385,092 B1 * 2/2013 Shekhawat ....... H02M 7/53871
363/56.04
(Continued)

FOREIGN PATENT DOCUMENTS

| JP | 08-340691 A | 12/1996 |
| JP | 2004-289985 A | 10/2004 |

(Continued)

OTHER PUBLICATIONS

Japan Patent Office, International Search Report issued in International Patent Application No. PCT/JP2018/042247, dated Feb. 5, 2019.
(Continued)

*Primary Examiner* — Yusef A Ahmed
(74) *Attorney, Agent, or Firm* — Baker Botts L.L.P.

(57) ABSTRACT

There is provided a power conversion device capable of eliminating a disadvantage of a sharp temperature rise in a switching element by using a discontinuous modulation method. The power conversion device includes a phase voltage command operation unit 33 which calculates a sinusoidal modulation voltage command value to be applied to a motor 8, an inter-line modulation operation unit 34 which, based on the sinusoidal modulation voltage command value, calculates a discontinuous modulation voltage command value for allowing an ON/OFF state of a switching element of one phase of a three-phase inverter circuit 28 to be fixed, and modulating ON/OFF states of switching elements of other two phases, and a PWM signal generation unit 36. The inter-line modulation operation unit sets a switching density of the switching element of at least one phase to a value different from that of the other phase.

9 Claims, 12 Drawing Sheets

(51) Int. Cl.
*H02P 29/68* (2016.01)
*B60H 1/32* (2006.01)

(56) References Cited

U.S. PATENT DOCUMENTS

| | | | |
|---|---|---|---|
| 9,322,587 B2* | 4/2016 | Shinomoto | F25B 30/02 |
| 2008/0186751 A1* | 8/2008 | Tokuyama | H02M 7/537 |
| | | | 363/131 |
| 2009/0072770 A1* | 3/2009 | Son | B60L 3/06 |
| | | | 318/139 |
| 2012/0234031 A1* | 9/2012 | Hatakeyama | F25B 49/025 |
| | | | 62/129 |
| 2012/0242268 A1* | 9/2012 | Yashiro | H02P 9/123 |
| | | | 318/503 |
| 2013/0152609 A1* | 6/2013 | Hatakeyama | H02M 7/53875 |
| | | | 62/56 |
| 2013/0269370 A1* | 10/2013 | Hatakeyama | H02M 7/53875 |
| | | | 62/56 |
| 2013/0291578 A1* | 11/2013 | Hatakeyama | F25B 49/025 |
| | | | 62/230 |
| 2014/0223926 A1* | 8/2014 | Hatakeyama | H02M 1/32 |
| | | | 62/56 |
| 2015/0089972 A1* | 4/2015 | Kamiya | F25B 1/005 |
| | | | 62/467 |
| 2016/0380575 A1* | 12/2016 | Tsumura | F25B 49/025 |
| | | | 318/478 |
| 2017/0155347 A1* | 6/2017 | Park | H02P 6/157 |
| 2018/0102723 A1* | 4/2018 | Kawashima | H02P 21/22 |
| 2018/0166892 A1* | 6/2018 | Sepe, Jr | H02J 7/345 |
| 2018/0226913 A1* | 8/2018 | Hatakeyama | H02M 7/538466 |
| 2018/0278144 A1* | 9/2018 | Nakano | H02M 7/797 |
| 2019/0199224 A1* | 6/2019 | Yukawa | H02M 7/53875 |
| 2019/0250046 A1* | 8/2019 | Sun | G01K 7/01 |
| 2020/0373854 A1* | 11/2020 | Tanaka | H02M 7/5395 |
| 2020/0403530 A1* | 12/2020 | Kashihara | H02M 7/53871 |
| 2020/0403548 A1* | 12/2020 | Hatakeyama | H02P 27/085 |
| 2021/0083614 A1* | 3/2021 | Krug | H02M 5/4585 |

FOREIGN PATENT DOCUMENTS

| | | |
|---|---|---|
| JP | 2010-275951 A | 12/2010 |
| JP | 2013-118783 A | 6/2013 |
| JP | 2014-236598 A | 12/2014 |
| JP | 2017-184368 A | 10/2017 |

OTHER PUBLICATIONS

Japan Patent Office, Notice of Reasons for Refusal issued in Japanese Patent Application No. 2017-246450 dated Aug. 31, 2021.

* cited by examiner

POWER CONVERSION DEVICE

CROSS-REFERENCE TO RELATED APPLICATIONS

This application is a U.S. National Stage Patent Application under 35 U.S.C. § 371 of International Patent Application No. PCT/JP2018/042247, filed on Nov. 15, 2018, which claims the benefit of Japanese Patent Application No. 2017-246450, filed on Dec. 22, 2017, the disclosures of each of which are incorporated herein by reference in their entirety.

TECHNICAL FIELD

The present invention relates to a power conversion device which supplies power to and drives a motor.

BACKGROUND ART

Conventionally, a power conversion device for driving a motor performs PWM (Pulse Width Modulation) control of switching elements of UVW respective phases of a three-phase inverter circuit, but in recent years, there has been proposed a power conversion device (inverter device) in which a method called discontinuous modulation (two-phase modulation) is applied to this PWM control unit, for the purpose of reducing loss and heat generation of the switching elements.

This discontinuous modulation type power conversion device fixes the ON/OFF state of any one of the UVW respective phases and controls only other two phases while modulating the ON/OFF state, thereby reducing the number of switching times of the switching element as compared with a sinusoidal modulation (three-phase modulation) method and performing the PWM control while reducing a switching loss and a heat generation amount (refer to, for example, Patent Document 1).

On the other hand, there has been adopted, for example, a configuration in which a power conversion device having a three-phase inverter circuit is integrally provided in an electric compressor used in a vehicle air conditioner for air conditioning the interior of a vehicle, and switching elements (semiconductor elements for power) of each phase of UVW are cooled by a suction refrigerant (low temperature gas refrigerant) (refer to, for example, Patent Document 2).

CITATION LIST

Patent Documents

Patent Document 1: Japanese Patent Application Laid-Open No. Hei 8(1996)-340691
Patent Document 2: Japanese Patent Application Laid-Open No. 2010-275951
Patent Document 3: Japanese Patent Application Laid-Open. No. 2017-184368

SUMMARY OF THE INVENTION

Problems to be Solved by the Invention

However, when each switching element is cooled by the suction refrigerant as in Patent Document 2, the cooling efficiency of the switching element of the phase disposed on the downstream side of the suction refrigerant is worse than that of the switching element of the phase disposed on its upstream side. Therefore, a problem also arises that heat generation caused by the switching loss of the phase switching element of the phase disposed on the downstream side during its operation causes the temperature of the switching element of the phase to rise sharply, thereby causing risk of generating thermal destruction of the inverter circuit and forcibly stopping the electric compressor to prevent damage of such an inverter circuit.

In order to solve such a problem, it may be considered that such a refrigerant flow path as shown in Patent Document 3, for example, is controlled to level the temperature of the switching element of each phase. It is however difficult to realize it in such an inverter-integrated electric compressor as shown in Patent Document 2 in particular because the structure is made complex.

The present invention has been made to solve such conventional technical problems. The present invention provides a power conversion device capable of eliminating the disadvantage that a switching element rises sharply in temperature by using a discontinuous modulation method.

Means for Solving the Problems

A power conversion device of the present invention is characterized by including a three-phase inverter circuit which drives a motor, a phase voltage command operation unit which calculates a sinusoidal modulation voltage command value to be applied to the motor, an inter-line modulation operation unit which calculates a discontinuous modulation voltage command value fixing ON/OFF states of predetermine one-phase switching elements of the three-phase inverter circuit and modulating ON/OFF states of other two-phase switching elements, based on the sinusoidal modulation voltage command value, and a PWM signal generation unit which generates a PWM signal PWM-controlling the three-phase inverter circuit, based on the discontinuous modulation voltage command value, and in that the inter-line modulation operation unit is capable of setting a switching density of the switching element of at least one phase to a value different from that of the other phase.

The power conversion device of the invention of claim 2 is characterized in that in the above invention, the inter-line modulation operation unit changes a switching density according to a temperature of the switching element.

The power conversion device of the invention of claim 3 is characterized in that in the above invention, the inter-line modulation operation unit reduces the switching density of the phase of the switching element whose temperature is higher than that of the switching element of the other phase.

The power conversion device of the invention of claim 4 is characterized in that in the above invention, the inter-line modulation operation unit compares the sinusoidal modulation voltage command values of each phase and fixes the ON/OFF state of the switching element of the phase whose absolute value becomes maximum, and when the sinusoidal modulation voltage command values of each phase are compared, the inter-line modulation operation unit multiplies the sinusoidal modulation voltage command values of phases having at least a switching density set to a value different from other phases by a predetermined bias value, and thereafter compares the sinusoidal modulation voltage command values of each phase.

The power conversion device of the invention of claim 5 is characterized in that in the above invention, the inter-line modulation operation unit sets the bias value to a value which is larger than 1 and 2 or less.

The power conversion device of the invention of claim 6 is characterized in that in the invention of claim 4 or 5, when the switching densities of the switching elements of each phase are made the same, the inter-line modulation operation unit sets the bias value to 1 or does not multiply the sinusoidal modulation voltage command value of each phase by the bias value when comparing the sinusoidal modulation voltage command values of each phase.

The power conversion device of the invention of claim 7 is characterized in that in the above respective inventions, the switching element is disposed in a heat exchange relation with a refrigerant sucked into an electric compressor.

Advantageous Effect of the Invention

According to the present invention, in a power conversion device including a three-phase inverter circuit which drives a motor, a phase voltage command operation unit which calculates a sinusoidal modulation voltage command value to be applied to the motor, an inter-line modulation operation unit which calculates a discontinuous modulation voltage command value fixing ON/OFF states of predetermine one-phase switching elements of the three-phase inverter circuit and modulating ON/OFF states of other two-phase switching elements, based on the sinusoidal modulation voltage command value, and a PWM signal generation unit which generates a PWM signal PWM-controlling the three-phase inverter circuit, based on the discontinuous modulation voltage command value, the inter-line modulation operation unit is capable of setting a switching density of the switching element of at least one phase to a value different from that of the other phase. Therefore, in the situation in which the temperatures of the switching elements of any one or two of the three phases become higher than the temperature in the other phase by heat generation caused by a switching loss during the operation of the switching element, the temperatures of the switching elements of each phase can be leveled, and the thermal destruction of the switching elements or the stop of the device associated with the risk of occurrence of the thermal destruction of the switching elements can be avoided in advance.

For example, as in the invention of claim 2, the inter-line modulation operation unit is capable of appropriately controlling the change of a switching density of the switching element by changing the switching density according to the temperatures of the switching elements.

In this case, as in the invention of claim 3, the inter-line modulation operation unit reduces the switching density of the phase of the switching element whose temperature is higher than the temperatures of the switching elements of other phases, thereby making it possible to suppress heat generation caused by a switching loss of the switching element of the phase high in temperature and to avoid in advance the disadvantage that the switching element of the phase rises sharply in temperature.

Further, as in the invention of claim 4, the inter-line modulation operation unit compares the sinusoidal modulation voltage command values of each phase and fixes the ON/OFF state of the switching element of the phase whose absolute value becomes maximum, and when comparing the sinusoidal modulation voltage command values of each phase, multiplies the sinusoidal modulation voltage command values of the phase making at least the switching density to be the value different from the other phase by predetermined bias values, followed by performing comparison between the sinusoidal modulation voltage command values of each phase. It is therefore possible to easily allocate the reduction degree of the number of switching times to each phase by setting the bias value and smoothly perform change control of the switching density.

In this case, as in the invention of claim 5, when the inter-line modulation operation unit sets the bias value to a value which is greater than 1 and 2 or less, it can also prevent the breakdown of discontinuous modulation.

Further, when the switching density of the switching element of each phase is made the same, as in the invention of claim 6, the inter-line modulation operation unit may set the bias value to 1 or may not multiply the sinusoidal modulation voltage command values of each phase by the bias values when comparing the sinusoidal modulation voltage command values of each phase.

Then, as in the invention of claim 7, the application of the present invention to the power conversion device in which the switching elements are disposed in a heat exchange relation with a refrigerant sucked into an electric compressor makes it possible to reduce the switching density of the switching element of the phase disposed at a position where cooling efficiency by the sucked refrigerant gets worse, avoid in advance the disadvantage that the switching element rises sharply in temperature, and eliminate the inconvenience of the electric compressor being forcibly stopped, etc.

MODE FOR CARRYING OUT THE INVENTION

Hereinafter, embodiments of the present invention will be described in detail based on the drawings. First, an electric compressor (a so-called inverter-integrated electric compressor) 16 according to an embodiment integrally provided with a power conversion device 1 of the present invention will be described with reference to FIG. 2 and FIG. 3. Incidentally, the electric compressor 16 according to the embodiment constitutes a part of a refrigerant circuit of a vehicle air conditioning device mounted on a vehicle such as an engine driven car, a hybrid car, an electric vehicle or the like.

(1) Configuration of Electric Compressor 16

Figure 2:
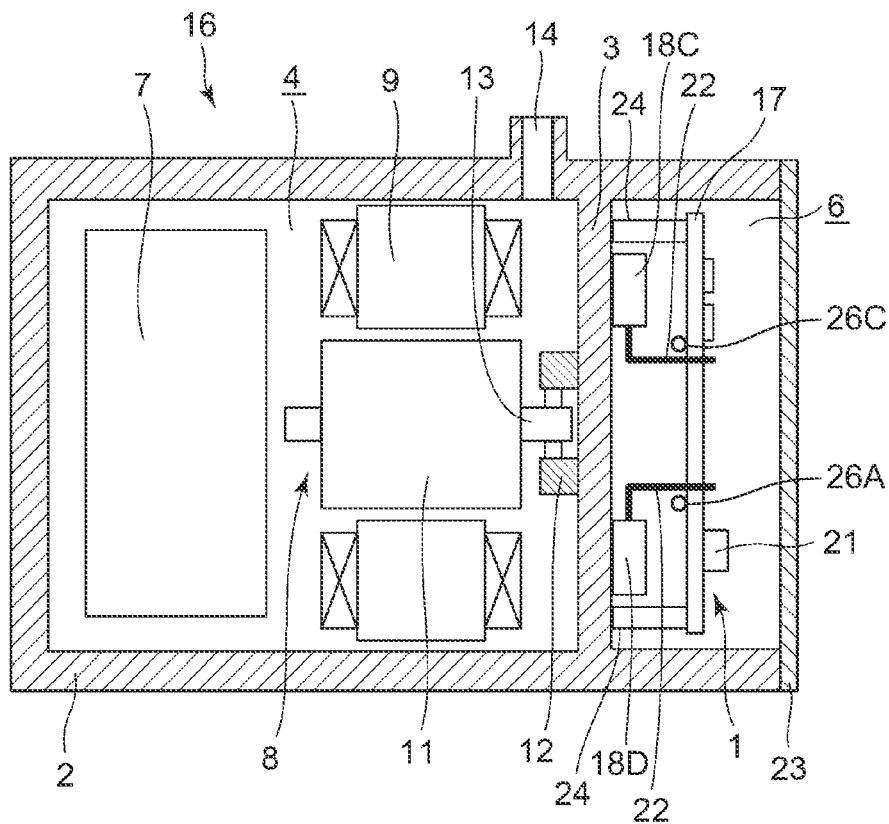
FIG. 2 is a longitudinal cross-sectional side view of an electric compressor of one embodiment provided with the power conversion device of FIG. 1.

In FIG. 2, the inside of a metallic cylindrical housing 2 of the electric compressor 16 is partitioned into a compression mechanism housing part 4 and an inverter housing part 6 by a partition wall 3 intersecting an axial direction of the housing 2. For example, a scroll-type compression mechanism 7 and a motor 8 which drives this compression mechanism 7 are accommodated in the compression mechanism housing part 4. In this case, the motor 8 is an IPMSM (Interior Permanent Magnet Synchronous Motor) composed of a stator 9 fixed to the housing 2 and a rotor 11 rotating inside the stator 9.

A bearing portion 12 is formed at the central portion of the partition wall 3 on the compression mechanism housing part 4 side. One end of a drive shaft 13 of the rotor 11 is supported by the bearing portion 12, and the other end of the drive shaft 13 is linked to the compression mechanism 7. A suction port 14 is formed in the vicinity of the partition wall 3 at a position corresponding to the compression mechanism housing part 4 of the housing 2. When the rotor 11 (drive shaft 13) of the motor 8 is rotated to drive the compression mechanism 7, a low temperature refrigerant which is a working fluid, flows from the suction port 14 into the compression mechanism housing part 4 of the housing 2 and is sucked into and compressed by the compression mechanism 7.

Then, the refrigerant compressed by the compression mechanism 7 and brought to a high temperature and high pressure is configured to be discharged from an unshown discharge port to the refrigerant circuit outside the housing 2. Further, since the low temperature refrigerant flowing from the suction port 14 passes near the partition wall 3 and passes around the motor 8 and is sucked by the compression mechanism 7, the partition wall 3 is also cooled.

And then, the power conversion device 1 of the present invention which drives and controls the motor 8 is housed in the inverter housing part 6 partitioned from the compression mechanism housing part 4 by the partition wall 3. In this case, the power conversion device 1 is configured to supply power to the motor 8 through a sealing terminal and a lead wire penetrating the partition wall 3.

(2) Structure of Power Conversion Device 1 (Arrangement of Switching Elements 18A to 18F)

In the case of the embodiment, the power conversion device 1 is composed of a substrate 17, six switching elements 18A to 18F wired on one surface side of the substrate 17, a control unit 21 wired on the other surface side of the substrate 17, an HV connector, an LV connector, etc. which are not shown in the drawing. In the embodiment, the switching elements 18A to 18F are constituted of an insulated gate bipolar transistor (IGBT) or the like in which a MOS structure is incorporated in a gate portion.

In this case, in the embodiment, the switching element 18A on the upper arm side of a L-phase inverter 19U of a three-phase inverter circuit (three-phase inverter circuit) 28 to be described later and the switching element 18D on the lower arm side thereof, the switching element 18B on the upper arm side of a V-phase inverter 19V and the switching element 18E on the lower arm side thereof, and the switching element 18C on the upper arm side of a W-phase inverter 19W and the switching element 18F on the lower arm side thereof 19W are in the form of being arranged two by two respectively. The thus-arranged respective pairs of switching elements 18A and 18D, switching elements 18B and 18E, and switching elements 18C and 18F are radially disposed around the center of the substrate 17 as shown in FIG. 3.

Figure 3:
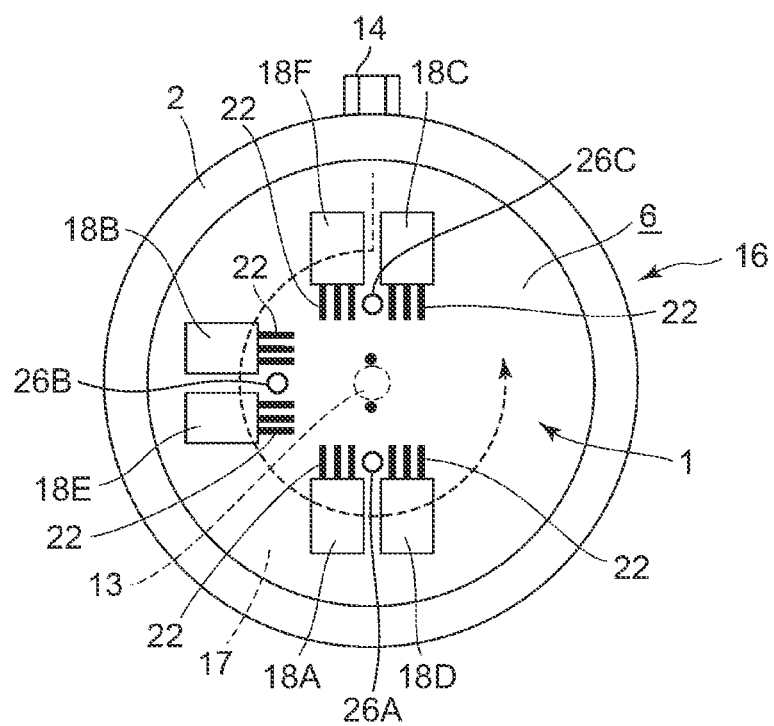
FIG. 3 is a side view of the electric compressor of FIG. 2 as viewed from the side of an inverter housing part except for a cover and a substrate.

Incidentally, in this application, the term "radial" also includes a U-shape as shown in FIG. 3. Further, the respective switching elements 18A to 18F may be disposed in a circular arc (fan shape) around the center of the substrate 17 without being limited to the arrangement shown in FIG. 3.

Further, in the embodiment, the switching elements 18C and 18F of the W-phase inverter 19W are located on the suction port 14 side. On the other hand, the switching elements 18B and 18E of the V-phase inverter 19V are arranged at positions turned at 90° counterclockwise in FIG. 3. The switching elements 18A and 18D of the U-phase inverter 19U are arranged at positions opposite to the suction port 14. Then, the refrigerant sucked from the suction port 14 rotates counterclockwise about the axis of the housing 2 as indicated by a broken line arrow in FIG. 3. Therefore, the switching elements 18C and 18F of the W-phase inverter 19W are located on the most upstream side with respect to the flow of the sucked refrigerant, the switching elements 18B and 18E of the V-phase inverter 19V are located downstream thereof, and the switching elements 18A and 18D of the U-phase inverter 19U are arranged on the most downstream side.

Further, terminal portions 22 of the respective switching elements 18A to 18F are connected to the substrate 17 in a state in which they are on the center side of the substrate 17. Furthermore, in this embodiment, a temperature sensor (thermistor) 26A for detecting the temperatures of the switching elements 18A and 18D is disposed on the substrate 17 in the vicinity of the terminal portions 22 of the switching elements 18A and 18D of the U-phase inverter 19U. A temperature sensor 26B for detecting the temperatures of the switching elements 18B and 18E is disposed on the substrate 17 in the vicinity of the terminal portions 22 of the switching elements 18B and 18E of the V-phase inverter 19V. A temperature sensor 26C for detecting the temperatures of the switching elements 18C and 18F is disposed on the substrate 17 in the vicinity of the terminal portions 22 of the switching elements 18C and 18F of the W-phase inverter 19W. The respective temperature sensors 26A to 26C are connected to the control unit 21.

Then, the power conversion device 1 assembled in this manner is accommodated in the inverter housing part 6 in a state in which one surface side of the respective switching elements 18A to 18F being present is on the partition wall 3 side, attached to the partition wall 3 and closed with a cover 23. In this case, the substrate 17 is fixed to the partition wall 3 via boss portions 24 which stand up from the partition wall 3.

Thus, in the state in which the power conversion device 1 is attached to the partition wall 3, the respective switching elements 18A to 18F are in close contact with the partition wall 3 directly or through a predetermined insulating heat conductive material and have heat exchange relation with the partition wall 3 of the housing 2. At this time, the respective switching elements 18A to 18F are disposed at positions avoiding locations corresponding to the bearings 12 and the drive shaft 13 and are arranged so as to surround their peripheries (FIG. 3).

Further, since the partition wall 3 is cooled by the refrigerant sucked into the compression mechanism housing part 4 as described above, the respective switching elements 18A to 18F are in heat exchange relation with the sucked refrigerant via the partition wall 3 and cooled by the refrigerant sucked into the compression mechanism housing part 4 through the thickness of the partition wall 3. The respective switching elements 18A to 18F themselves dissipate heat to the refrigerant through the partition wall 3.

(3) Circuit Configuration of Power Conversion Device 1

Figure 1:
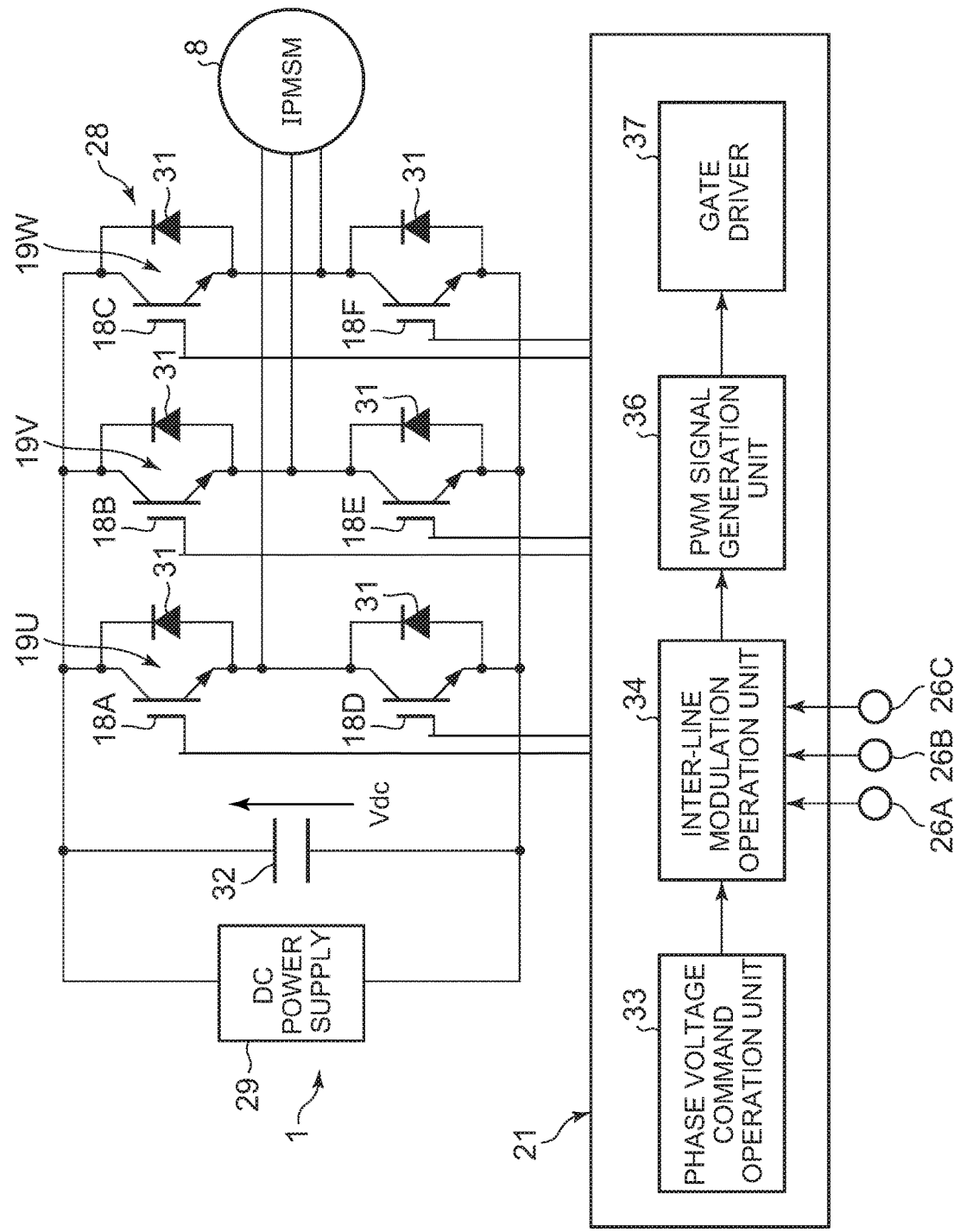
FIG. 1 is an electric circuit diagram of a power conversion device according to one embodiment of the present invention.

Next, in FIG. 1, the power conversion device 1 includes the three-phase inverter circuit (three-phase inverter circuit) 28 and the control unit 21 described above. The inverter circuit 28 is a circuit which converts a DC voltage of a DC power supply (battery) 29 into a three-phase AC voltage and applies it to an armature coil of the stator 9 of the motor 8. This inverter circuit 28 has the U-phase inverter 19U, the V-phase inverter 19V, and the W-phase inverter 19W described above. The phase inverters 19U to 19W respectively have the switching elements 18A to 18C on the upper arm side described above and the switching elements 18D to 18F on the lower arm side individually. Further, flywheel diodes 31 are connected in antiparallel to the switching elements 18A to 18F respectively.

Then, the upper end sides of the switching elements 18A to 18C on the upper arm side of the inverter circuit 28 are connected to the positive electrode sides of the DC power supply 29 and a smoothing capacitor 32. Incidentally, although the smoothing capacitor 32 is also provided on the substrate 17 to constitute the power conversion device 1, it is not shown in FIG. 2 and FIG. 3 in order to make the arrangement of the switching elements 18A to 18F easy to understand. On the other hand, the lower end sides of the switching elements 18D to 18F on the lower arm side of the inverter circuit 28 are connected to the negative electrode sides of the DC power supply 29 and the smoothing capacitor 32.

Further, the U-phase inverter 19U is connected to the U-phase armature coil of the motor 8 between the switching element 18A on the upper arm side and the switching element 18D on the lower arm side. The V-phase inverter 19V is connected to the V-phase armature coil of the motor 8 between the switching element 18B on the upper arm side of the V-phase inverter 19V and the switching element 18E on the lower arm side thereof. The W-phase inverter 19W is connected to the W-phase armature coil of the motor 8 between the switching element 18C on the upper an side of the W-phase inverter 19W and the switching element 18F on the lower arm side thereof.

(4) Configuration of Control Unit 21

Next, the control unit 21 is configured of a microcomputer having a processor. The control unit 21 receives a rotation speed command value from the vehicle ECU, receives a phase current from the motor 8, and controls ON/OFF states of the switching elements 18A to 18F of the inverter circuit 28, based on these. Specifically, the control unit 21 controls a gate voltage applied to a gate terminal of each of the switching elements 18A to 18F.

Figure 4:
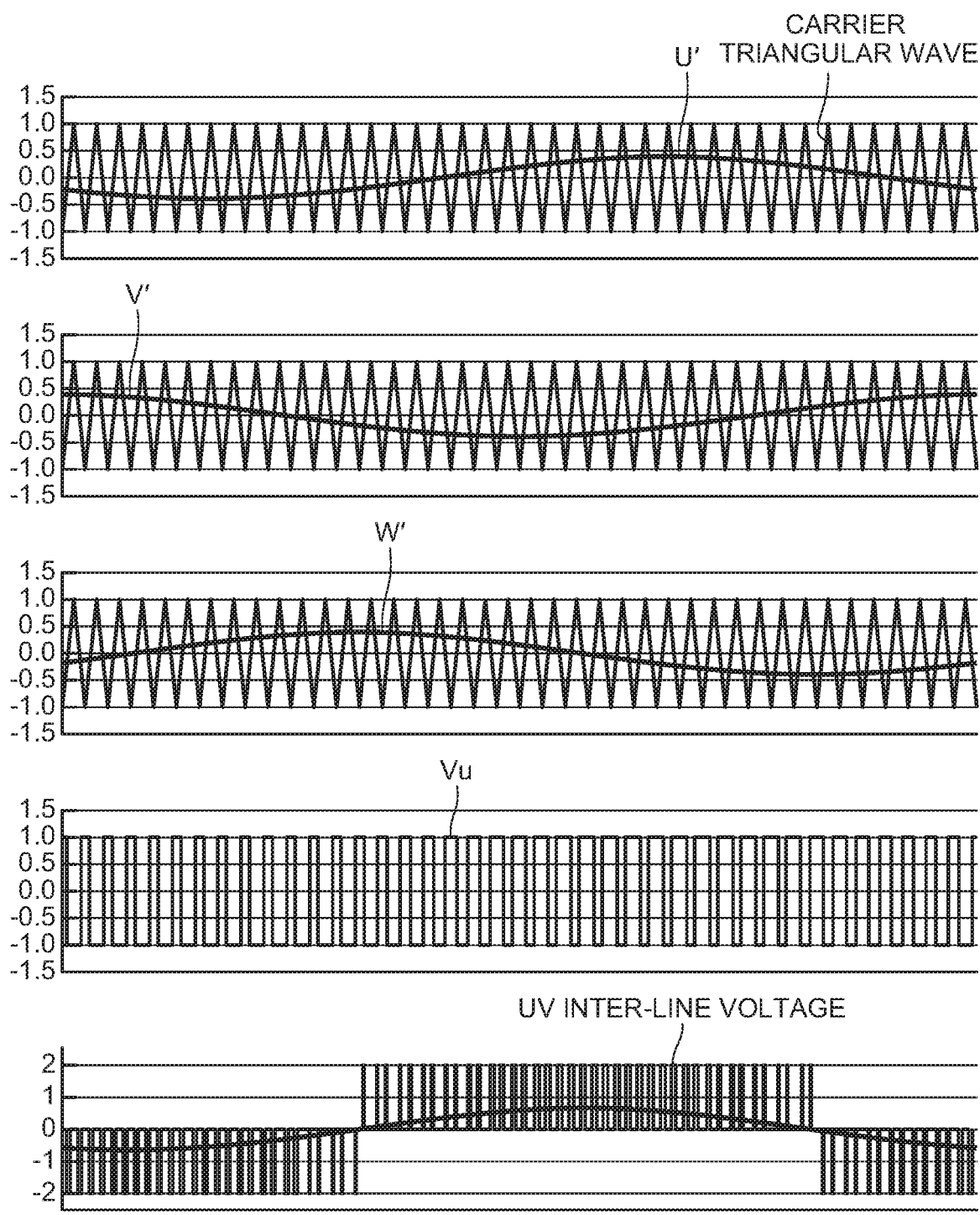
FIG. 4 is a diagram showing a sinusoidal modulation voltage command value and a carrier triangular wave output by a phase voltage command operation unit of the power conversion device of FIG. 1.

The control unit 21 has a phase voltage command operation unit 33, an inter-line modulation operation unit 34, a PWM signal generation unit 36, and a gate driver 37. The phase voltage command operation unit 33 calculates sinusoidal modulation voltage command values U' (U-phase voltage command value), V' CV-phase voltage command value), and W' (W-phase voltage command value) each of which is applied to the armature coil of each phase of the motor 8, based on the electrical angle, current command value and phase current of the motor 8. The sinusoidal modulation voltage command values U', V', and W' are values after normalization (after correction to −1 to 1) of the voltage command value where sinusoidal modulation control of the motor 8 is performed, and are shown in FIG. 4. Incidentally, a carrier triangular wave to be compared by the PWM signal generation unit 36 to be described later is also shown in FIG. 4 simultaneously. Further, Vu shown in FIG. 4 is a PWM signal (U phase) to be described later where the sinusoidal modulation control of the motor 8 is performed. A UV inter-line voltage in FIG. 4 is a potential difference between the U phase and the V phase to be described later in the case where the sinusoidal modulation control is performed similarly.

The inter-line modulation operation unit 34 calculates discontinuous modulation voltage command values U (U-phase voltage command value) V (V-phase voltage command value), and W (W-phase voltage command value) on the basis of the calculated sinusoidal modulation voltage command values U', V', and W' calculated by the phase voltage command operation unit 33. The operation of this inter-line modulation operation unit 34 will be described in detail later.

The PWM signal generation unit 36 generates, based on the calculated discontinuous modulation voltage command values U, V, and W calculated by the inter-line modulation operation unit 34, PWM signals Vu, Vv, and Vw which become dive command signals for the U-phase inverter 19U, the V-phase inverter 19V, and the W-phase inverter 19W of the inverter circuit 28, by comparing their magnitude with the carrier triangular wave.

The gate driver 37 generates, based on the PWM signals Vu, Vv, and Vw output from the PWM signal generation unit 36, gate voltages Vvu and Vvl of the switching elements 18A and 18D of the U-phase inverter 19U, gate voltages Vvu and Vvl of the switching elements 18B and 18E of the V-phase inverter 19V, and gate voltages Vwu and Vwl of the switching elements 18C and 18F of the W-phase inverter 19W. These gate voltages Vuu, Vul, Vvu, Vwu, and Vwl can be represented by a duty which is a time ratio of an ON state in a predetermined time.

Then, the respective switching elements 18A to 18F of the inverter circuit 28 are ON/OFF driven based on the gate voltages Vuu, Vul, Vvu, Vvl, Vwu, and Vwl output from the gate driver 37. That is, when the gate voltage is brought into an ON state (predetermined voltage value), the transistor is ON-operated. When the gate voltage is brought into an OH state (zero), the transistor is OFF operated. The gate driver 37 is a circuit for applying a gate voltage to the IGBT, based on the PWM signal when the switching elements 18A to 18F are the above-described IGBT, and is composed of a photocoupler, a logic IC, a transistor, or the like.

(5) Operation of Inter-Line Modulation Operation Unit 34

Figure 5:
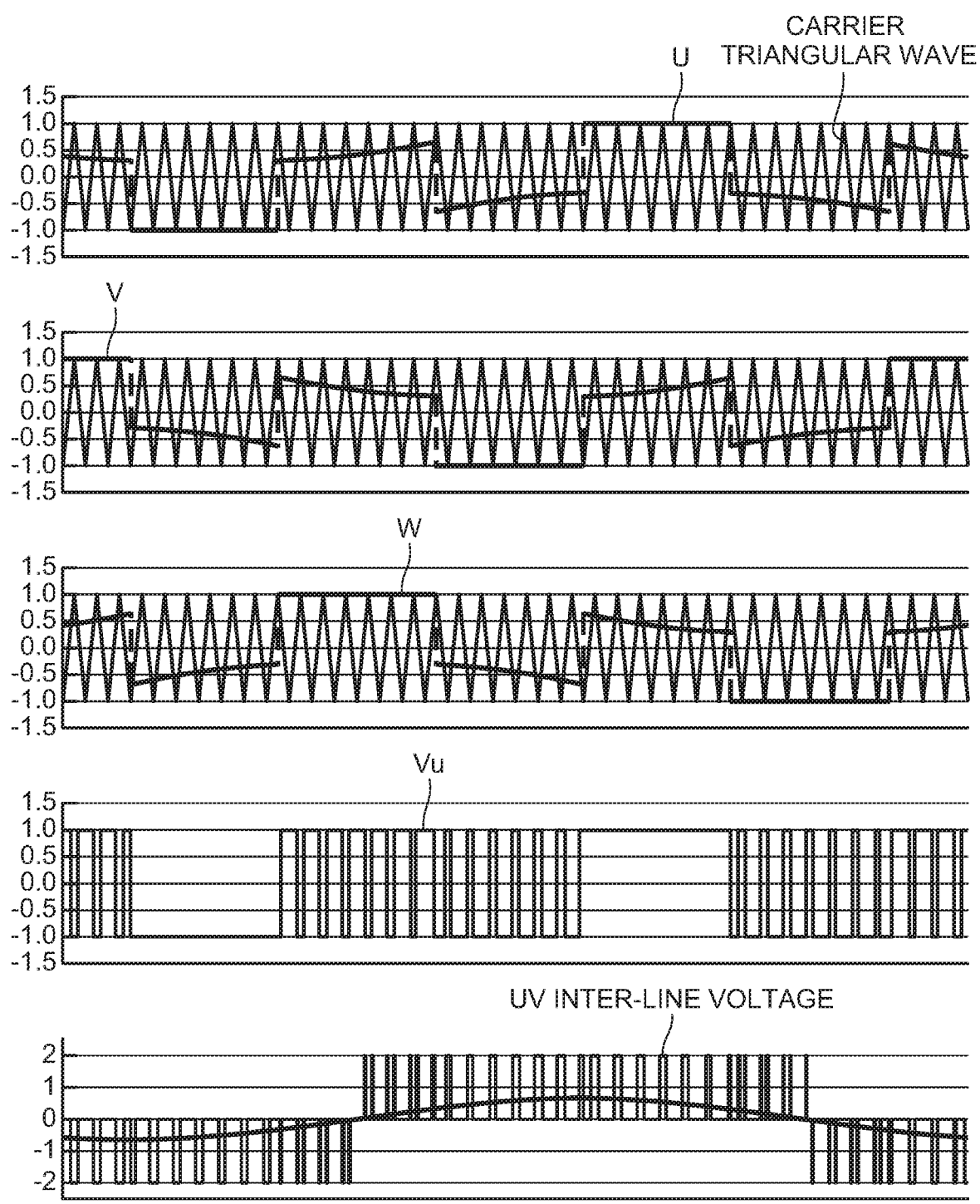
FIG. 5 is a diagram showing a discontinuous modulation voltage command value output by an inter-line modulation operation unit of the power conversion device of FIG. 1, and a PWM waveform and a carrier triangular wave output by a PWM signal generation unit.

Next, the operation/calculation operation of the discontinuous modulation voltage command values U, V, and W in the inter-line modulation operation unit 34 of the control unit 21 will be described in detail with reference to FIG. 5 to FIG. 13. The discontinuous modulation voltage command values U, V, and W calculated by the inter-line modulation operation unit 34 are values after normalization of the voltage command value for performing discontinuous modulation control of the motor 8 (after correction to −1 to 1). An example is shown in FIG. 5. Incidentally, the carrier triangular wave to be compared by the PWM signal generation unit 36 is also shown in FIG. 5 simultaneously. Further, Vu shown in FIG. 5 is a PWM signal (U phase) for performing the discontinuous modulation control of the motor 8. A UV inter-line voltage in FIG. 5 is a potential difference between the U-phase and the V phase in the discontinuous modulation control.

(5-1) Basic Operation of Inter-Line Modulation Operation Unit 34

The inter-line modulation operation unit 34 basically compares the U-phase voltage command value U', V-phase voltage command value V', and W-phase voltage command value W' each being the sinusoidal modulation voltage command value of each phase calculated by the phase voltage command operation unit 33 to calculate and output the U-phase voltage command value U, V-phase voltage command value V, and W-phase voltage command value W each being the discontinuous modulation voltage command value for fixing the ON/OFF states of the switching elements 18A to 18F of the phase maximized in absolute value to the ON or OFF state, thereby performing discontinuous modulation control to reduce the number of switching times of the switching elements 18A to 18F as compared with the case where the sinusoidal modulation control is performed.

Next, specific comparison operation and fixed phase determination control therefor will be described in detail. First, when comparing the sinusoidal modulation voltage command values U', V', and W' as described above, the inter-line modulation operation unit 34 of the embodiment multiplies each value by predetermined bias values biasU, biasV, and biasW as in the following formulas (i) to (iii) to calculate comparison values U'comp, V'comp, and W'comp.

$$U'\text{comp} = \text{bias}U \times U' \quad \text{(i)}$$

$$V'\text{comp} = \text{bias}V \times V' \quad \text{(ii)}$$

$$W'\text{comp} = \text{bias}W \times W' \quad \text{(i)}$$

Next, the comparison values U'comp, V'comp, and W'comp are compared by the formulas (iv) and (v) to calculate the maximum value K1 and the minimum value K2 of them.

$$K1 = \max(U'\text{comp}, V'\text{comp}, W'\text{comp}) \quad \text{(iv)}$$

$$K2 = \max(U'\text{comp}, V'\text{comp}, W'\text{comp}) \quad \text{(v)}$$

When the maximum value K1 is greater than or equal to the absolute value of the minimum value K2, that is, when K1≥abs (K2), the maximum value K1 is taken to be K3. When the absolute value of the minimum value K2 is greater than the maximum value K1, that is, when K1<abs (K2), the minimum value K2 is taken to be K3.

Then, when K3 is the comparison value U' comp, that is, when K3=U'comp, the U-phase voltage command value U' is taken to be K. Further, when K3 is the comparison value V'comp, that is, when K3=V'comp, the V-phase voltage command value V' is taken to be K. When K3 is the comparison value W'comp, that is, K3=W'comp, the W-phase voltage command value W' is taken to be K.

After K is determined in this manner, the U-phase voltage command value U, V-phase voltage command value V, and W-phase voltage command value each being the discontinuous modulation voltage command value are calculated using the following formulas (vi) to (viii).

$$U = U' - K + \text{sign}(K) \quad \text{(vi)}$$

$$V = V' - K + \text{sign}(K) \quad \text{(vii)}$$

$$W = W' - K + \text{sign}(K) \quad \text{(vii)}$$

However, sign (K) is assumed to become 1 when K is a positive value, and is assumed to become −1 when K is a negative value. Further, it can be understood from the respective formulas (vi) to (viii) that the inter-line voltage does not change in the sinusoidal modulation control and the discontinuous modulation control.

Accordingly, when the U-phase voltage command value U' is K, the U-phase voltage command value U becomes 1 when the comparison value U'comp is the maximum value K1, and the U-phase voltage command value U becomes when the comparison value U'comp is the minimum value K2. Thus, during a period in which the U-phase voltage command value U' is K, the ON/OFF states of the switching elements 18A and 18D of the U-phase inverter 19U are fixed and the number of times of switching is reduced accordingly.

Also, in the case where the V-phase voltage command value V' is K, the V-phase voltage command value V becomes 1 when the comparison value V'comp is the maximum value K1, and the V-phase voltage command value V becomes −1 when the comparison value V'comp is the minimum value K2. Thus, during a period in which the V-phase voltage command value V' is K, the ON/OFF states of the switching elements 18B and 18E of the V-phase inverter 19V are fixed, and the number of times of switching is reduced accordingly.

Further, in the case where the W-phase voltage command value W' is K, the W-phase voltage command value W becomes 1 when the comparison value W'comp is the maximum value K1, and the W-phase voltage command value W becomes −1 when the comparison value W'comp is the minimum value K2. Thus, during a period in which the W-phase voltage command value W' is K, the ON/OFF states of the switching elements 18C and 18F of the W-phase inverter 19W are fixed, and the number of times of switching is reduced accordingly.

FIG. 5 shows the U-phase voltage command value U, V-phase voltage command value V, and W-phase voltage command value W output from the inter-line modulation operation unit 34, the U-phase PWM signal Vu output from the PWM signal generation unit 36, and the UV inter-line voltage where the bias values biasU biasV, and biasW multiplied by the above-described formulas (i) to (iii) are all taken as 1 (biasU=biasV=biasW=1). In FIG. 5, during a period in which the U phase voltage command value is 1 or −1 the ON/OFF states of the switching elements 18A and 18D of the U-phase inverter 19U are fixed. During a period in which the V-phase voltage command value V is 1 or −1, the ON/OFF states of the switching elements 18B and 18E of the V-phase inverter 19V are fixed, and the ON/OFF states of the switching elements 18C and 18F of the W-phase inverter 19W are fixed.

Thus, when the total number of switchings per period of the switching elements 18A to 18F of each phase in the sinusoidal modulation control is defined as 6/6 (U phase)+6/6 (V phase)+6/6 (W phase)=18/6, the number of switching times of the switching elements 18A to 18F of each phase is reduced to ⅔ in any case and becomes 4/6 (U phase)+4/6 (V phase)+4/6 (W phase)=12/6 in the discontinuous modulation control as shown in FIG. 5. Therefore, according to the discontinuous modulation control, a switching loss generated in each of the switching elements 18A to 18F and heat generation thereby are suppressed as compared with the sinusoidal modulation control.

(5-2) Change Control of Switching Density by Inter-Line Modulation Operation Unit 34 (Part 1)

When the bias values biasU, biasV, and biasW multiplied in the formulas (i) to (iii) are all taken to be 1 as shown in FIG. 5 (biasU=biasV=biasW=1), the number of switching times of the switching elements 18A to 18F of each phase becomes the same, and hence the number of switchings per period (switching density in the present invention) also becomes the same even in each phase. Accordingly, it is considered that the heat generated in each of the switching elements 18A to 18F also becomes the same.

However, for example, as shown in FIG. 3, when the switching elements 18C and 18F of the W-phase inverter 19W are located most upstream with respect to the flow of the sucked refrigerant, the switching elements 18B and 18E of the V-phase inverter 19V are located downstream thereof, and the switching elements 18A and 18D of the U-phase inverter 19U are disposed on the most downstream side, the cooling effect of the switching elements 18B and 18E of the V-phase inverter 19V located on the downstream side more than the switching elements 18C and 18F of the W-phase inverter 19W becomes worse than that of the W phase, and the cooling effect of the switching elements 18A and 18D of the U phase inverter 19U located downstream of the switching elements 18B and 18E of the V phase inverter 19V becomes even worse.

Therefore, when the temperature rises sharply due to heat generation caused by the switching loss at the time of the operation of the U-phase switching elements 18A and 18D, for example, there occurs a risk that thermal destruction of the three-phase inverter circuit 28 will occur. Thus, in the embodiment, when the temperatures of the switching elements 18A to 18F of any phase rise above a predetermined protection threshold, on the basis of the outputs of the temperature sensors 26A to 26C, the control unit 21 forcibly stops the electric compressor 16 to prevent the breakage of the three-phase inverter circuit 28. In the present invention, however, before that, the inter-line modulation operation unit 34 of the control unit 21 executes control to suppress a temperature rise of the switching element of the phase in which the temperature rise is sharp.

The details will be specifically described below. For example, when the temperatures of the switching elements 18A and 18D are higher than those of the switching elements 18B and 18E of another V-phase inverter 19V or the switching elements 18C and 18F of the W-phase inverter 19W detected by the temperature sensor 26B or the temperature sensor 26C according to the temperatures of the switching elements 18A and 18D of the U phase inverter 19U detected by the temperature sensor 26A, or when the high state continues for a predetermined time, the inter-line modulation operation unit 34 sets the bias value biasU to be multiplied by the above-described formulas (i) to (iii) to be a value larger than 1, and sets the biasV and biasW to be 1.

Here, the inter-line modulation operation unit 34 determines the above bias values biasV, and biasW in a range of 1 or more and 2 or less (1≤bias value≤2). The reason therefor will be described using FIG. 6 to FIG. 8. When an intermediate value among the sinusoidal modulation voltage command values U', V', and W' is adopted as K described above, the sinusoidal modulation voltage command values of the other phases are out of the range of −1 to 1, so that interline modulation fails. This can be understood by adopting an intermediate value for K in the above-mentioned formulas (vi) to (viii).

Figure 6:
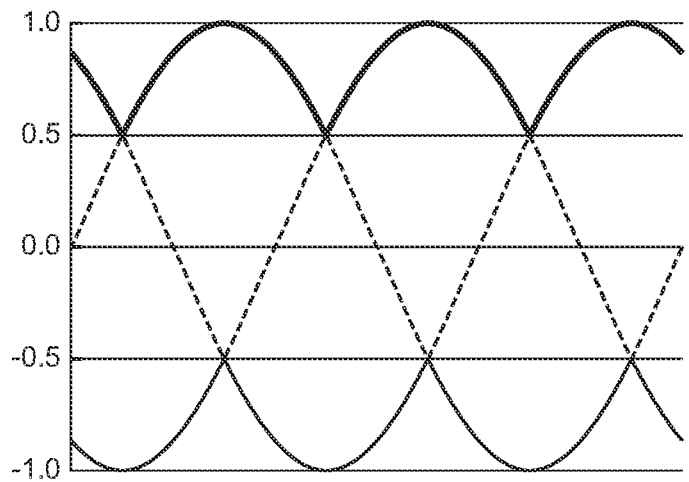
FIG. 6 is a diagram for describing the range of a bias value in the inter-line modulation operation unit of the power conversion device of FIG. 1.
Figure 7:
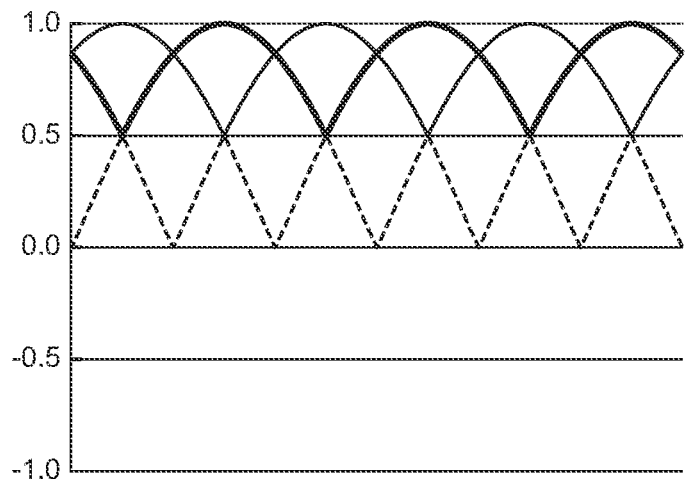
FIG. 7 is a diagram for describing the range of a bias value in the inter-line modulation operation unit of the power conversion device of FIG. 1 similarly.

That is, since the intermediate value cannot be adopted for K, it is impossible to set such a bias value that the absolute value of the intermediate value becomes larger than the absolute value of the maximum value/minimum value. Although the sinusoidal modulation voltage command values U', V', and W' are shown in FIG. 6, a thick solid line in FIG. 6 becomes the maximum value, a thin solid line becomes the minimum value, and a broken line becomes an intermediate value. Those obtained by converting FIG. 6 into absolute values are shown in FIG. 7. In FIG. 7, the intermediate value (broken line) is closest to the maximum value (thick solid line) and the minimum value (thin solid line) when the intermediate value is 0.3.

Figure 8:
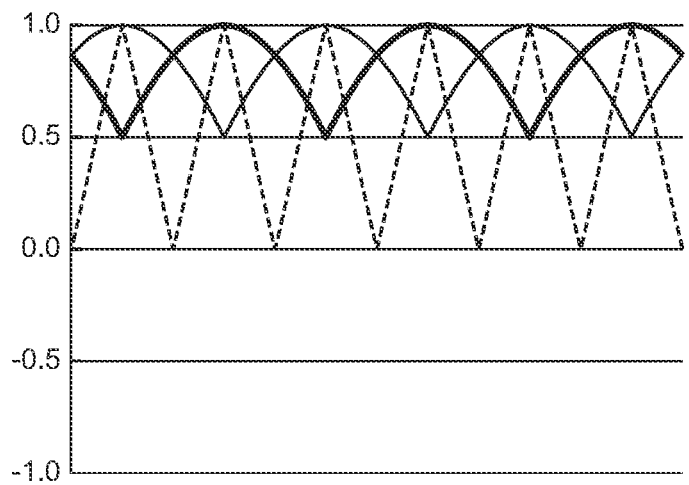
FIG. 8 is a diagram for describing the range of a bias value in the inter-line modulation operation unit of the power conversion device of FIG. 1 similarly.

Therefore, one obtained by doubling the intermediate value of FIG. 7 (bias value=2) is shown in FIG. 8. In this figure, when the intermediate value is 0.5, it is doubled to be 1, which coincides with the maximum value/minimum value (since the intermediate value 0.5 coincides with the maximum value/minimum value here, the interline modulation does not fail even if adopted for K). Also, as long as the other areas are taken, even if the intermediate value is doubled, it is not adopted because it is smaller than the maximum value/minimum value. For the above reasons, the bias values biasU, biasV, and biasW set by the inter-line modulation operation unit 34 are set to a value of 2 or less. Further, when the number of switching times of the switching elements 18A to 18F of each phase is made the same as shown in FIG. 5, the bias values biasU, biasV, and biasW are all set to 1 (biasU=biasV=biasW=1). When the switching density is reduced as described later, the bias value is set to a value larger than 1. Thus, as a result, the bias values biasU, biasV, and biasW are determined in the range of 1 or more and 2 or less.

As in the example of FIG. 3, for example, when the temperature of each of the switching elements 18A and 18D of the U-phase inverter 19U is higher than that of the other phase, or when the high state continues for a predetermined time, the inter-line modulation operation unit 34 sets the bias value biasU to a value larger than 1, and sets the biasV and biasW to 1. However, in the embodiment, the bias value biasU is determined according to the degree of a rise in the temperature of each of the switching elements 18A and 18D of the U-phase inverter 19U with respect to the other phase. Specifically, the bias value biasU is increased as the temperature of each of the switching elements 18A and 18D of the U-phase inverter 19U is higher than that of the other phase, and the difference between the temperatures is larger. However, it is a range which is larger than 1 and 2 or less.

Figure 9:
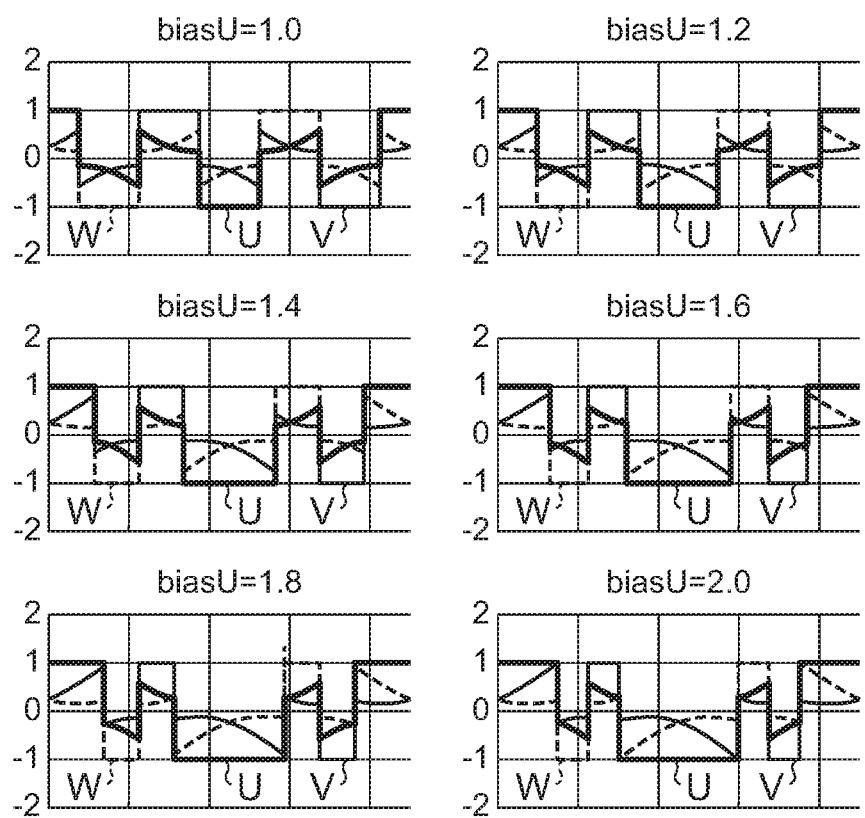
FIG. 9 is a diagram showing a PWM waveform, etc. where a discontinuous modulation voltage command value of a U phase is multiplied by a bias value in the inter-line modulation operation unit of the power conversion device of FIG. 1.
Figure 10:
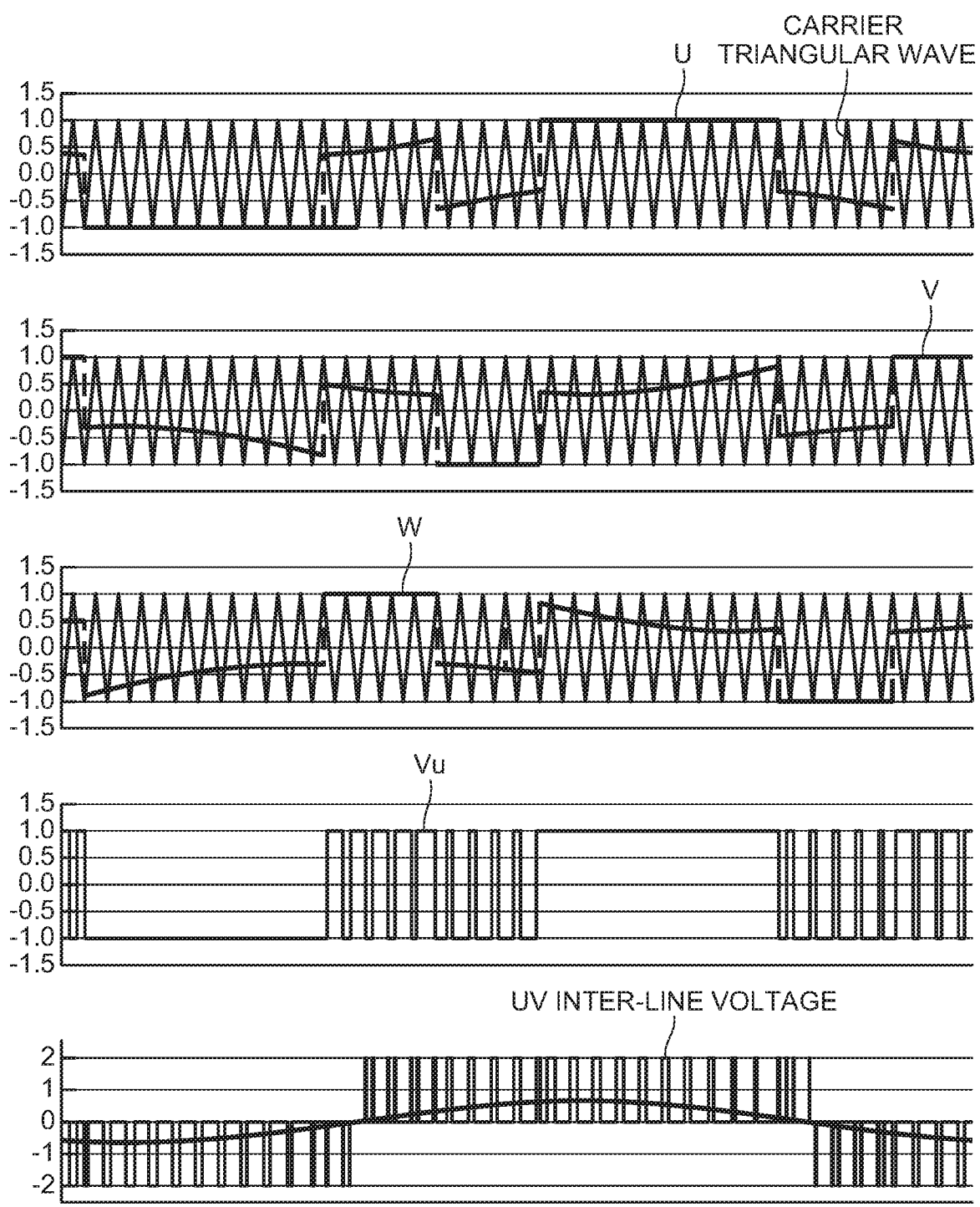
FIG. 10 is a diagram showing a discontinuous modulation voltage command value, a PWM waveform, and a carrier triangular wave in the case of a bias value=1.4 in FIG. 9.
Figure 11:
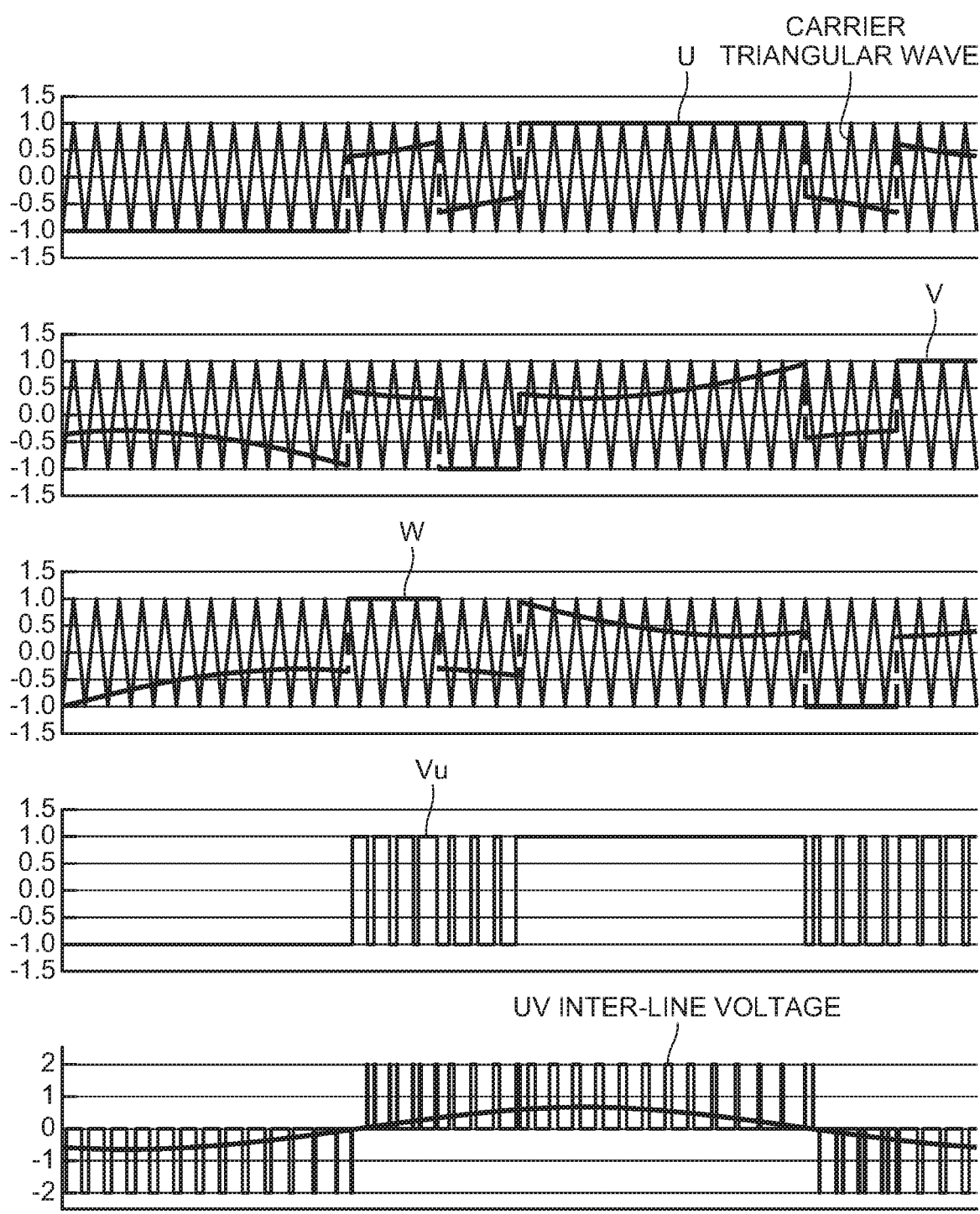
FIG. 11 is a diagram showing a discontinuous modulation voltage command value, a PWM waveform, and a carrier triangular wave in the case of a bias value=1.8 in FIG. 9.
Figure 12:
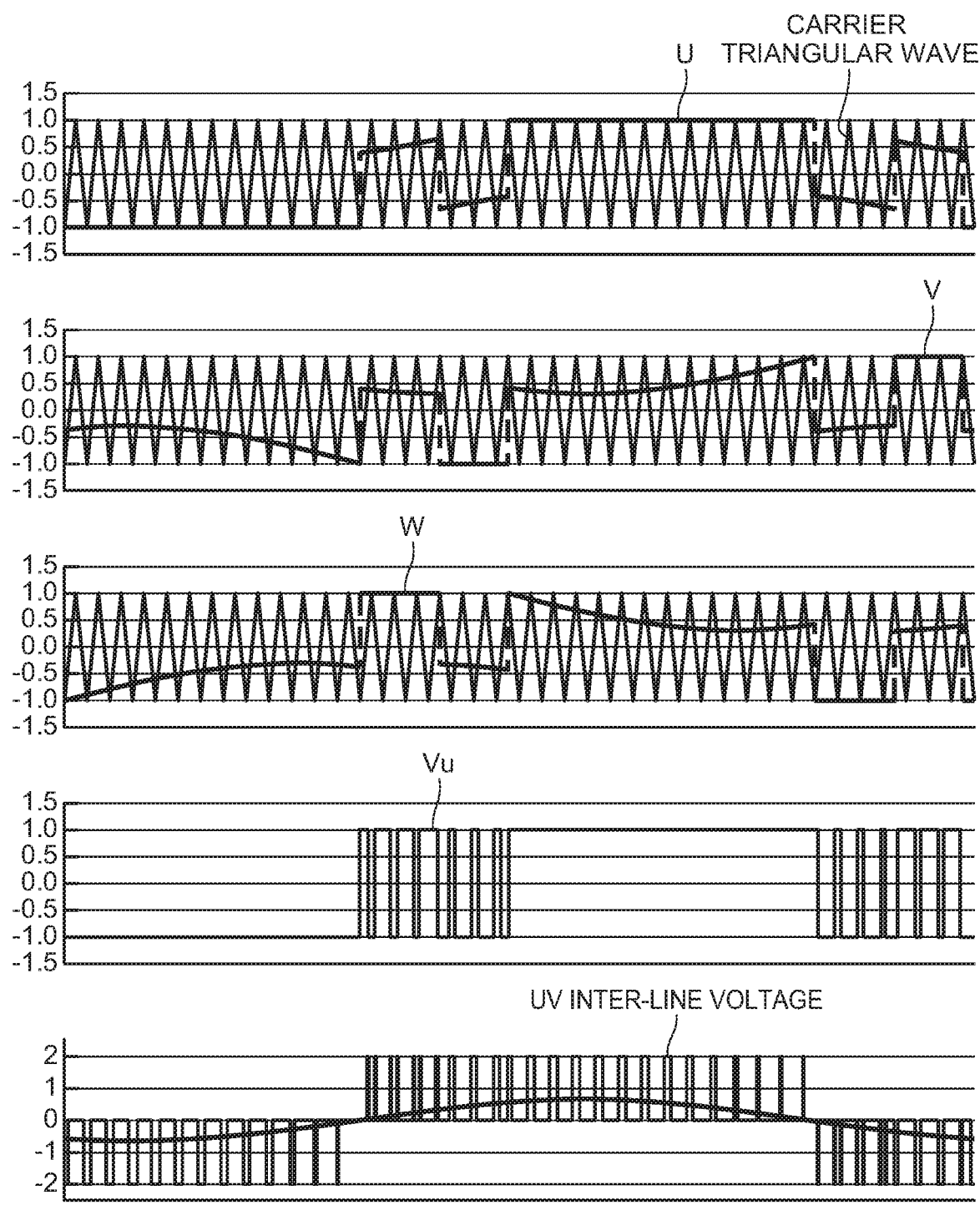
FIG. 12 is a diagram showing a discontinuous modulation voltage command value, a PWM waveform, and a carrier triangular wave in the case of a bias value=2.0 in FIG. 9.

FIG. 9 shows changes in the discontinuous modulation voltage command values U, V, and W when the bias values biasU=1.0, biasU=1.2, biasU=1.4, biasU=1.6, biasU=1.8, and biasU=2.0. FIG. 10 shows details when the biasU=1.4, FIG. 11 shows details when the biasU=1.8, and FIG. 12 shows details when the biasU=2.0, respectively (FIG. 5 is a detail of biasU=1, and biasV=biasW=1).

As is clear from the respective figures, as the bias value biasU increases, the period in which the ON/OFF states of the switching elements 18A and 18D of the U-phase inverter 19U are fixed (period in which the U-phase voltage command value U becomes 1 or −1) becomes long, and the number of switching times per period is reduced accordingly to reduce the switching density. Then, when the maximum biasU=2, the number of switching times of the switching elements 18A and 18D of the U-phase inverter 19U becomes 2/6, and the numbers of switching times of the switching elements 18B and 18E of the V-phase inverter 19V and the switching elements 18C and 18F of the W-phase inverter 19W both become 5/6 (the total is 2/6+5/6+5/6, which is reduced by 1 than 6/6+6/6+6/6 of the sinusoidal in modulation control).

That is, the switching density of each of the switching elements 18A and 18D of the U-phase inverter 19U sharp in temperature rise becomes a value different from the switching density of the other phase, and is lower than the switching densities of the switching dements 18B and 18E of the V-phase inverter 19V and the switching elements 18C and 18F of the W-phase inverter 19W. Thus, the heat generation of the switching elements 18A and 18D of the U-phase inverter 19U is suppressed, so that the temperature is lowered to the same value as the switching elements of other phases even in the situation in which the cooling efficiency by the sucked refrigerant is bad, and thermal destruction will not occur.

(5-3) Change Control of Switching Density by Inter-Line Modulation Operation Unit 34 (Part 2)

On the other hand, for example, when the temperatures of the switching elements 18A and 18D of the U-phase inverter 19U detected by the temperature sensor 26A and the temperatures of the switching elements 18B and 18E of the V-phase inverter 19V detected by the temperature sensor 26B are higher than those of the switching elements 18C and 18F of the W-phase inverter 19W detected by the temperature sensor 26C, or when the high state continues for a predetermined time, the inter-line modulation operation unit 34 sets the bias values biasU and biasV to a value larger than 1, and sets the biasW to 1.

Even in this case, in the embodiment, the bias values biasU and biasV are determined according to the degrees of the temperature rises of the switching elements 18A and 18D of the U-phase inverter 19U and the switching elements 18B and 18E of the V-phase inverter 19V with respect to the W phase. Specifically, as the temperatures of the switching elements 18A and 18D of the U-phase inverter 19U and the switching elements 18B and 18E of the V-phase inverter 19V are higher than those of the W-phase, and its difference is larger, the bias values biasU and biasV are increased. However, even in this case, they are in the range of larger than 1 and 2 or less.

Figure 13:
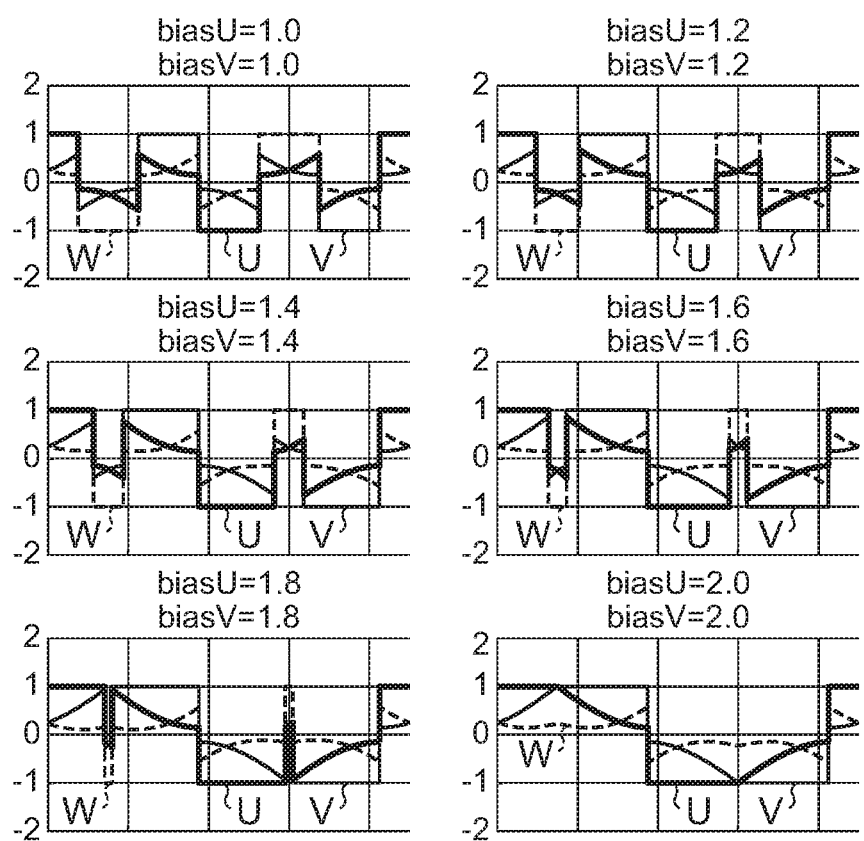
FIG. 13 is a diagram showing a PWM waveform, etc. where discontinuous modulation voltage command values of a U phase and a V phase are respectively multiplied by bias values in the inter-line modulation operation unit of the power conversion device of FIG. 1.
Figure 14:
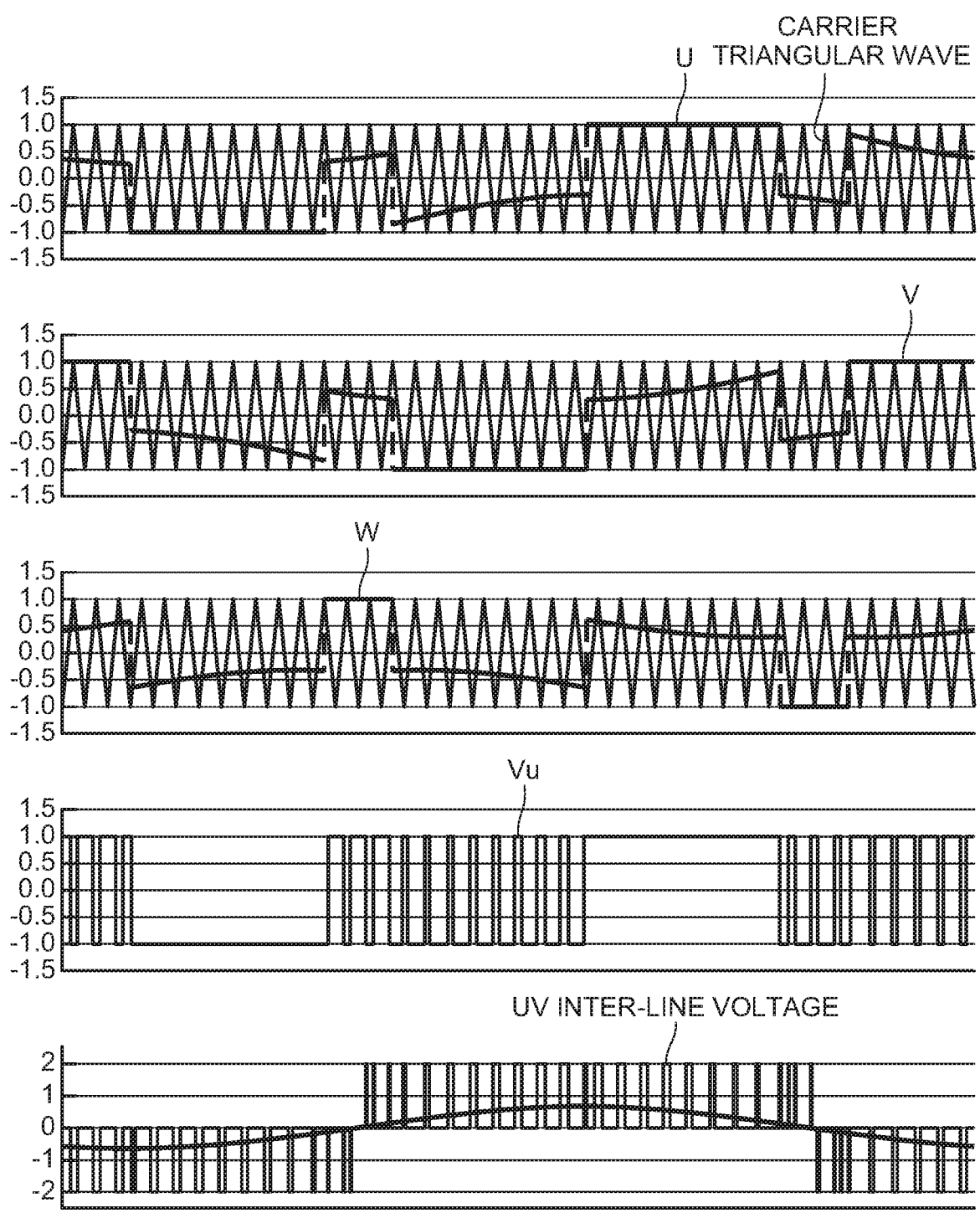
FIG. 14 is a diagram showing a discontinuous modulation voltage command value, a PWM waveform, and a carrier triangular wave in the case of a bias value=1.4 in FIG. 13.
Figure 15:
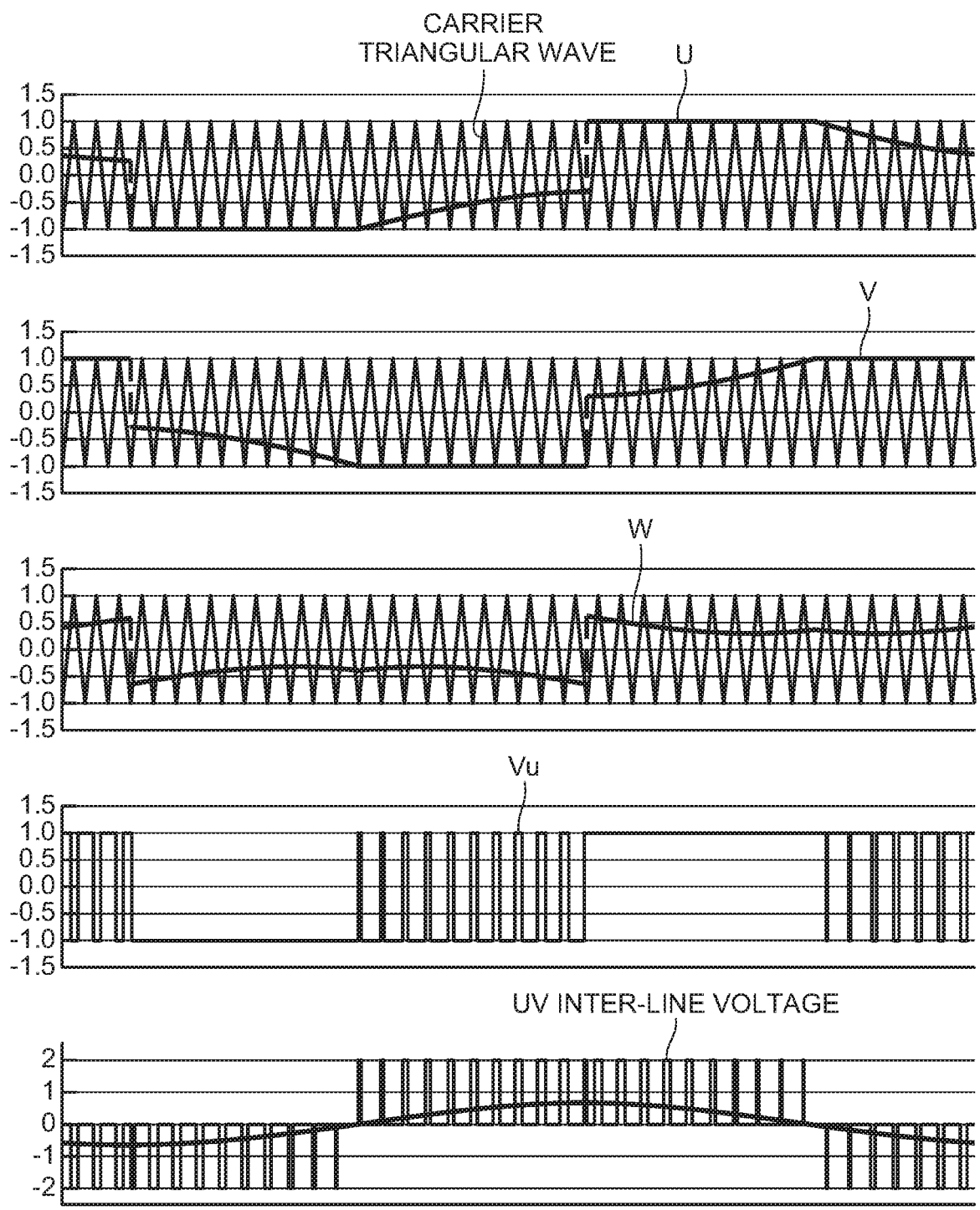
FIG. 15 is a diagram showing a discontinuous modulation voltage command value, a PWM waveform, and a carrier triangular wave in the case of a bias value=2.0 in FIG. 13.

FIG. 13 shows changes in the discontinuous modulation voltage command values U, V, and W when the bias values biasU=biasV=1.0, biasU=biasV=1.2, biasU=biasV=1.4, biasU=biasV=1.6, biasU=biasV=1.8, and biasU=biasV=2.0. FIG. 14 shows details when the biasU=biasV=1.4, and FIG. 15 shows details when the biasU=biasV=2.0, respectively (the biasW=1).

As apparent from the respective figures, as the bias values biasU and biasV increase, the period (period in which the U-phase; voltage command value U and the V-phase voltage command value V become 1 or −1) in which the ON/OFF states of the switching elements 18A and 18D of the U-phase inverter 19U and the switching elements 18B and 18E of the V-phase inverter 19V are fixed becomes long, and the number of switching times per period is reduced accordingly to reduce the switching density. Then, when the maximum biasU=biasV=2, the numbers of switching times of the switching elements 18A and 18D of the U-phase inverter 19U and the switching elements 18B and 18E of the V-phase inverter 19V become 3/6 respectively, and the number of switching times of the switching elements 18C and 18F of the W-phase inverter 19W becomes 6/6 (constant switching) (the total is 3/6+3/6+6/6, which is reduced by 1 than 6/6+6/6+6/6 of the sinusoidal modulation control even in this case).

That is, the switching densities of the switching elements 18A and 18D of the phase inverter 19U and the switching elements 18E and 18E of the V-phase inverter 19V, which are sharp in temperature rise, become values different from the switching density of the W phase, and is lowered than the switching density of each of the switching elements 18C and 18F of the W-phase inverter 19W. Thus, heat generation of the switching elements 18A and 18D of the U-phase inverter 19U and the switching elements 18E and 18E of the V-phase inverter 19V is suppressed. Therefore, even in a situation in which the cooling efficiency by the sucked refrigerant is worse than the W phase, the temperature is lowered to a value equivalent to that of each of the switching elements 18C and 18F of the W-phase inverter 19W, and thermal destruction does not occur.

Further, as described above, after multiplying the sinusoidal modulation voltage command values U', V', and W' by the bias values biasU, biasV, and biasW, they are compared with each other. Consequently, only by setting the ratio of each bias value, the reduction value of the number of switching times (the reduction value of the number of switching times when changing from the sinusoidal modulation control to the discontinuous modulation control=1) can be automatically allocated to each phase.

As described above in detail, in the power conversion device 1 having the three-phase inverter circuit 28 which drives the motor 8, the phase voltage command operation unit 33 which calculates the sinusoidal modulation voltage command values U', V', and W' applied to the motor 8, the inter-line modulation operation unit 34 which, based on the sinusoidal modulation voltage command values U', V', and W', calculates the discontinuous modulation voltage command values U, V and W fixing the ON/OFF states of predetermined one-phase switching elements (for example, 18A and 18D) of the three-phase inverter circuit 28, and modulating the ON/OFF states of other two-phase switching elements (for example, 18B and 18E and 18C and 18F), and the PWM signal generation unit 36 which generates the PWM signals Vu, Vv, and Vw which PWM-control the three-phase inverter circuit 28 based on the discontinuous modulation voltage command values U, V, and W, the inter-line modulation operation unit 34 is capable a setting the switching density of the switching element of at least one phase to be a value different from that of the other phase. Therefore, in the situation in which the temperatures of the switching elements of any one or two of the three phases become higher than the other phase by heat generation caused by the switching loss during the operation of the switching element, the temperatures of the switching elements 18A to 18F of each phase can be leveled, and the thermal destruction of the switching elements 18A to 18F or the stop of the electric compressor 16 associated with the risk of occurrence of the thermal destruction of the switching elements 18A to 18F can be avoided in advance.

Further, in the embodiment, since the inter-line modulation operation unit 34 changes the switching density according to the temperatures of the switching elements 18A to 18F, it is possible to appropriately control the change of the switching density of each of the switching elements 18A to 18F.

In this case, in the embodiment, the inter-line modulation operation unit 34 reduces the switching density of the phase of the switching element (for example, 18A and 18D) high in temperature than the switching elements of other phases. Therefore, it is possible to suppress the heat generation caused by the switching loss of the switching element of the phase high in temperature and hence avoid in advance the disadvantage that the switching element (for example, 18A and 18D) of the phase rises sharply in temperature.

Further, in the embodiment, the inter-line modulation operation unit 34 compares the sinusoidal modulation voltage command values U', V', and W' of each phase and fixes the ON OFF state of the switching element of the phase whose absolute value becomes maximum, and upon comparing the sinusoidal modulation voltage command values of each phase, multiplies the sinusoidal modulation voltage command values U', V', and W' of the phase making at least the switching density to be the value different from the other phase by the predetermined bias values biasU, biasV, and biasW, followed by performing comparison between the sinusoidal modulation voltage command values of each phase. It is therefore possible to easily allocate the reduction degree of the number of switching limes to each phase by setting the bias value and to smoothly perform change control of the switching density.

In this case, since the inter-line modulation operation unit 34 sets the bias values biasU, biasV, and biasW to a value which is greater than 1 and 2 or less, it can also prevent the breakdown of discontinuous modulation.

Here, in the embodiment, when the switching density of the switching element of each phase is made the same, the inter-line modulation operation unit 34 sets the bias values biasU, biasV, and biasW to 1, but may not multiply the sinusoidal modulation voltage command values U', V', and W' of each phase by the bias values when comparing the sinusoidal modulation voltage command values U', V', and W'.

Then, as in the embodiment, the application of the present invention to the power conversion device 1 in which the switching elements 18A to 18F are disposed in the heat exchange relation with the refrigerant sucked into the electric compressor 16 makes it possible to reduce the switching density of the switching element (for example, 18A and 18D) of the phase disposed at the position where the cooling efficiency by the sucked refrigerant gets worse, avoid in advance the disadvantage that the switching element rises sharply in temperature, and eliminate the inconvenience of the electric compressor 16 being forcibly stopped, etc.

Incidentally, in the embodiment, the temperatures of the respective switching elements 18A to 18F are detected by the temperature sensors 26A to 26C. However, the present invention is not limited thereto, and the control unit 21 may estimate the states of the temperatures of the respective switching elements 18A to 18F from characteristics thereof at the time of driving thereof.

Also, in the embodiment, all the sinusoidal modulation voltage command values U', V', and W' are multiplied by the bias values biasU, biasV, and biasW and then compared, but they may be compared after only the sinusoidal modulation voltage command values of the phase to attempt to make the switching density to be the value different from other phases are multiplied by the bias values.

Further, in the embodiment, although the present invention is applied to the power conversion device 1 which drives and controls the motor 8 of the electric compressor 16, the present invention is not limited thereto. The present invention is effective in drive control of a motor for various devices having a risk that the temperature of the switching element of any phase rises more than in other phases.

DESCRIPTION OF REFERENCE NUMERALS 1 power conversion device
8 motor
16 electric compressor
18A-18F switching elements
19U U-phase inverter
19V V-phase inverter
19W W-phase inverter
21 control unit
26A-26C temperature sensor
28 three-phase inverter circuit
33 phase voltage command operation unit
34 inter-line modulation operation unit
36 PWM signal generation unit
37 gate driver.

The invention claimed is:
1. A power conversion device comprising:
a three-phase inverter circuit which drives a motor;
a phase voltage command operation unit which calculates a sinusoidal modulation voltage command value to be applied to the motor;
an inter-line modulation operation unit which calculates a discontinuous modulation voltage command value fixing ON/OFF states of predetermined switching elements of one phase of the three-phase inverter circuit and modulating ON/OFF states of switching elements of other two phases of the three-phase inverter circuit, based on the sinusoidal modulation voltage command value; and
a PWM signal generation unit which generates a PWM signal PWM-controlling the three-phase inverter circuit, based on the discontinuous modulation voltage command value,
wherein the inter-line modulation operation unit is configured to set a switching density of the switching elements of at least one phase of the three-phase inverter circuit to a value different from that of the switching elements of the other two phases,
wherein the inter-line modulation operation unit changes the switching density according to a temperature of the switching elements of the at least one phase, and
wherein the inter-line modulation operation unit reduces the switching density of the switching elements of the at least one phase whose temperature is higher than that of the switching elements of the other two phases.

2. The power conversion device according to claim 1, wherein the inter-line modulation operation unit compares the sinusoidal modulation voltage command values of each phase of the three-phase inverter circuit and fixes the ON/OFF state of the switching elements of the phase whose absolute value becomes maximum, and
wherein when the sinusoidal modulation voltage command values of each phase of the three-phase inverter circuit are compared, the inter-line modulation operation unit multiplies the sinusoidal modulation voltage command values of phases of the three phase inverter circuit having at least a switching density set to a value different from other phases of the three phase inverter circuit by a predetermined bias value, and thereafter compares the sinusoidal modulation voltage command values of each phase of the three phase inverter circuit.

3. The power conversion device according to claim 2, wherein the inter-line modulation operation unit sets the bias value to a value which is larger than 1 and less than or equal to 2.

4. The power conversion device according to claim 3, wherein when the switching densities of the switching elements of each phase of the three-phase inverter circuit are made the same, the inter-line modulation operation unit sets the bias value to 1 or does not multiply the sinusoidal modulation voltage command value of each phase of the three-phase inverter circuit by the bias value when comparing the sinusoidal modulation voltage command values of each phase of the three-phase inverter circuit.

5. The power conversion device according to claim 3, wherein each of the switching elements of each phase of the three-phase inverter circuit is disposed in a heat exchange relation with a refrigerant sucked into an electric compressor.

6. The power conversion device according to claim 2, wherein when the switching densities of the switching elements of each phase of the three-phase inverter circuit are made the same, the inter-line modulation operation unit sets the bias value to 1 or does not multiply the sinusoidal modulation voltage command value of each phase of the three-phase inverter circuit by the bias value when comparing the sinusoidal modulation voltage command values of each phase of the three-phase inverter circuit.

7. The power conversion device according to claim 6, wherein each of the switching elements of each phase of the three-phase inverter circuit is disposed in a heat exchange relation with a refrigerant sucked into an electric compressor.

8. The power conversion device according to claim 2, wherein each of the switching elements of each phase of the three-phase inverter circuit is disposed in a heat exchange relation with a refrigerant sucked into an electric compressor.

9. The power conversion device according to claim 1, wherein each of the switching elements of each phase of the three-phase inverter circuit is disposed in a heat exchange relation with a refrigerant sucked into an electric compressor.

* * * * *